(12) United States Patent
Yang et al.

(10) Patent No.: US 11,469,980 B2
(45) Date of Patent: *Oct. 11, 2022

(54) NETWORK ACCESS METHOD AND TERMINAL

(71) Applicant: Huawei Technologies Co., Ltd., Shenzhen (CN)

(72) Inventors: Lin Yang, Xi'an (CN); Kaibing Zhang, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 24 days.

This patent is subject to a terminal disclaimer.

(21) Appl. No.: 17/085,358

(22) Filed: Oct. 30, 2020

(65) Prior Publication Data

US 2021/0051086 A1 Feb. 18, 2021

Related U.S. Application Data

(63) Continuation of application No. 16/091,816, filed as application No. PCT/CN2016/078491 on Apr. 5, 2016, now Pat. No. 10,841,189.

(51) Int. Cl.
*H04L 43/08* (2022.01)
*H04W 48/18* (2009.01)
(Continued)

(52) U.S. Cl.
CPC .......... *H04L 43/08* (2013.01); *H04L 41/5003* (2013.01); *H04L 43/16* (2013.01);
(Continued)

(58) Field of Classification Search
CPC ..... H04L 41/5003; H04L 43/08; H04L 43/16; H04L 47/74; H04L 47/76; H04L 47/80;
(Continued)

(56) References Cited

U.S. PATENT DOCUMENTS 10,454,839 B1 * 10/2019 Lin ......................... H04L 45/28
2002/0087716 A1 * 7/2002 Mustafa .................. H04L 47/34
709/236
(Continued)

FOREIGN PATENT DOCUMENTS

CN 102131236 A 7/2011
CN 103731907 A 4/2014
(Continued)

*Primary Examiner* — Kan Yuen
(74) *Attorney, Agent, or Firm* — Conley Rose, P.C.

(57) ABSTRACT

A network access method and a terminal relate to the communications field, where the method includes obtaining, by the terminal, a priority of a first network service, determining, by the terminal according to a relationship between a network service priority and a network service class, a network service class required for performing the first network service, where the relationship is stored in the terminal, obtaining, by the terminal, a network service class of a first network currently accessed by the terminal, accessing, by the terminal, a second network whose network service class is higher than the network service class of the first network when the network service class of the first network is lower than the network service class required for performing the first network service, and performing the first network service using the second network.

18 Claims, 5 Drawing Sheets

(51) Int. Cl.
*H04L 47/74* (2022.01)
*H04W 28/02* (2009.01)
*H04L 47/80* (2022.01)
*H04L 47/76* (2022.01)
*H04L 41/5003* (2022.01)
*H04L 43/16* (2022.01)
*H04W 36/30* (2009.01)
*H04W 36/36* (2009.01)
*H04W 88/06* (2009.01)

(52) U.S. Cl.
CPC .............. *H04L 47/74* (2013.01); *H04L 47/76* (2013.01); *H04L 47/80* (2013.01); *H04W 28/0247* (2013.01); *H04W 48/18* (2013.01); *H04W 36/30* (2013.01); *H04W 36/36* (2013.01); *H04W 88/06* (2013.01)

(58) Field of Classification Search
CPC . H04W 28/0247; H04W 36/14; H04W 36/16; H04W 36/165; H04W 36/22; H04W 36/24; H04W 36/26; H04W 36/30; H04W 36/36; H04W 48/18; H04W 88/06
See application file for complete search history.

(56) References Cited

U.S. PATENT DOCUMENTS

| | | | |
|---|---|---|---|
| 2005/0060425 A1 | 3/2005 | Yeh et al. | |
| 2005/0094609 A1* | 5/2005 | Tandai | H04W 48/16 455/452.2 |
| 2005/0254435 A1 | 11/2005 | Moakley et al. | |
| 2009/0040937 A1* | 2/2009 | Xhafa | H04L 41/5003 370/252 |
| 2009/0310579 A1* | 12/2009 | Furuta | H04W 72/10 370/338 |
| 2010/0054185 A1* | 3/2010 | Kaneko | H04L 41/5003 370/328 |
| 2010/0130241 A1 | 5/2010 | Kitaji | |
| 2010/0331034 A1 | 12/2010 | Ishii et al. | |
| 2014/0126363 A1 | 5/2014 | Zeng et al. | |
| 2014/0185519 A1* | 7/2014 | Zhang | H04W 48/18 370/328 |
| 2014/0362822 A1 | 12/2014 | Tseng et al. | |
| 2016/0352648 A1* | 12/2016 | Iovanna | H04L 45/02 |
| 2017/0272995 A1* | 9/2017 | Kim | H04W 4/24 |

FOREIGN PATENT DOCUMENTS

| | | |
|---|---|---|
| CN | 103945411 A | 7/2014 |
| CN | 104902525 A | 9/2015 |
| CN | 104904166 A | 9/2015 |
| EP | 1531646 B1 | 11/2010 |
| JP | 2005109722 A | 4/2005 |
| JP | 2008136118 A | 6/2008 |
| JP | 2014523201 A | 9/2014 |
| WO | 2004008793 A1 | 1/2004 |
| WO | 2009034930 A1 | 3/2009 |
| WO | 2013104494 A1 | 7/2013 |
| WO | 2014105320 A1 | 7/2014 |
| WO | 2015042389 A1 | 3/2015 |

* cited by examiner

NETWORK ACCESS METHOD AND TERMINAL

CROSS-REFERENCE TO RELATED APPLICATIONS

This application is a continuation of U.S. patent application Ser. No. 16/091,816 filed on Oct. 5, 2018, which is a U.S. National Stage of International Patent Application No. PCT/CN2016/078491 filed on Apr. 5, 2016, both of which are hereby incorporated by reference in their entireties.

TECHNICAL FIELD

The present invention relates to the communications field, and in particular, to a network access method and a terminal.

BACKGROUND

Currently, a terminal (for example, a mobile phone or a router) can access a wireless network by using a WiFi (WIreless-Fidelity, Wireless Fidelity) service, access a cellular network by using a 3G (3rd-Generation, third generation mobile telecommunications technology)/4G (the 4th Generation mobile communication technology, fourth generation mobile telecommunications technology) service, or access a fixed network by using a broadband service. In addition, the terminal can switch a currently used network in different scenarios.

For example, when a user accesses the Internet outdoors by using a mobile phone, the user may access, by using a 3G/4G service, a cellular network to perform various services such as a voice service, a video service, a download service, and a web page browsing service. When the user arrives home, the terminal may access, according to a stored WiFi password and user name, a wireless network by using a WiFi service.

However, once the terminal accesses a network, the network provides service indicators such as a jitter value, a delay, and a packet loss rate that are required by all services requested by the user from the terminal, and quality of service that can be provided by the network changes in real time. For example, a maximum transmission rate that can be provided by the wireless network at a first moment is 800 K/s, and a transmission rate of 700 K/s is required when the terminal performs a download service. In this case, the wireless network can support the download service performed by the terminal. However, if a maximum transmission rate that can be provided by the wireless network at a second moment is only 500 K/s, the wireless network cannot satisfy the maximum transmission rate required by the terminal to perform the download service. As a result, a problem such as an intermittent stop or even a service interruption occurs when the terminal performs the download service.

SUMMARY

Embodiments of the present invention provide a network access method and a terminal, so as to avoid a problem such as an intermittent stop or a service interruption caused by that a current network cannot meet service requirements of all network services.

To achieve the foregoing objective, the following technical solutions are used in the embodiments of the present invention.

According to a first aspect, an embodiment of the present invention provides a network access method, including: obtaining, by a terminal, a priority of a to-be-performed first network service; determining, by the terminal according to a relationship between a network service priority and a network service class, a network service class required for performing the first network service, where the relationship is stored in the terminal, and the network service class is used to indicate network quality; and obtaining, by the terminal, a network service class of a first network currently accessed by the terminal, and if the network service class of the first network is lower than the network service class required for performing the first network service, that is, network quality indicated by the network service class of the first network cannot meet the network quality required for performing the first network service, accessing, by the terminal, a second network whose network service class is higher than the network service class of the first network, and performing the first network service by using the second network.

The network service class of the second network is higher than the network service class of the first network, that is, network quality of the second network is higher than the network quality of the first network. Therefore, after a switch from the first network to the second network, it can be ensured that the first network service does not encounter an intermittent stop, an interruption, or a like problem due to deterioration of the network quality provided by the current first network or due to a limited overall service indicator that can be provided by the current first network.

In a possible design, the method further includes: monitoring, by the terminal, M (M is an integer greater than or equal to 1) quality of service parameters of each of N networks (N is an integer greater than 1) that are accessible to the terminal, where the M quality of service parameters include at least one of a delay, a jitter value, a bit error rate, a maximum transmission rate, a minimum transmission rate, or an average transmission rate; and determining, by the terminal, a network service class of each network according to the M quality of service parameters of each of the N networks.

Because network quality of the N networks changes in real time, the terminal may establish a correspondence between network service classes and different networks according to the network service class of each network that is obtained by using the foregoing method.

For example, for each of the N networks, the terminal may separately determine whether each of the M quality of service parameters of each network meets a corresponding preset threshold condition. Then, the terminal counts a quantity of quality of service parameters that are in the M quality of service parameters and that meet the corresponding preset threshold condition. The terminal determines the network service class of each of the N networks according to the quantity. A larger quantity indicates higher network quality of service indicated by the network service class of the network.

In a possible design, after the accessing, by the terminal, a second network, the method further includes: counting, by the terminal, a first bandwidth occupancy rate in the second network; and if the first bandwidth occupancy rate is greater than a first threshold, accessing, by the terminal, a WAN by simultaneously using the second network and at least one network different from the second network.

Because bandwidth that can be provided by the terminal in different networks is limited, to meet bandwidth requirements of all network services (including the first network service) running in the terminal, after a switch from the first network to the second network, the terminal counts the first bandwidth occupancy rate in the second network. When the first bandwidth occupancy rate is greater than the first threshold, the terminal may access the WAN by simultaneously using the second network and at least one network different from the second network, so as to meet the bandwidth requirements of all the network services running in the terminal.

In a possible design, the method further includes: if the network service class of the first network is higher than or equal to the network service class required for performing the first network service, counting, by the terminal, a second bandwidth occupancy rate in the first network; and if the second bandwidth occupancy rate is greater than a second threshold, accessing, by the terminal, a WAN by simultaneously using the first network and at least one network different from the first network.

In a possible design, the accessing, by the terminal, a second network includes: comparing, by the terminal, a tariff of the second network with a tariff of the first network; and if the tariff of the second network is lower than the tariff of the first network, accessing, by the terminal, the second network.

When the tariff of the second network is lower than the tariff of the first network, the terminal may directly switch from the first network to the second network. This can ensure that the terminal provides relatively high network quality for the first network service, and can also reduce a network access expense of a user.

In a possible design, after the comparing, by the terminal, a tariff of the second network with a tariff of the first network, the method further includes: if the tariff of the second network is higher than the tariff of the first network, determining, by the terminal, a candidate network from the N networks that are accessible to the terminal, where a network service class of the candidate network is higher than the network service class of the first network, and a tariff of the candidate network is lower than the tariff of the second network; and using, by the terminal, the candidate network as the second network, and accessing the second network.

When the tariff of the second network is higher than the tariff of the first network, because the network service class of the candidate network is higher than the network service class of the first network, and the tariff of the candidate network is lower than the tariff of the second network, to ensure relatively high network quality for the first network service while reducing the network access expense of the user, the terminal may use the candidate network as the second network and access the second network.

In a possible design, the obtaining, by a terminal, a priority of a to-be-performed first network service includes: obtaining, by the terminal, an IP packet of the first network service; parsing, by the terminal, a TOS field in the IP packet; and determining the priority of the first network service according to the TOS field.

According to a second aspect, an embodiment of the present invention provides a terminal, including: an obtaining unit, configured to: obtain a priority of a to-be-performed first network service, and obtain a network service class of a first network currently accessed by the terminal; a determining unit, configured to determine, according to a relationship between a network service priority and a network service class, a network service class required for performing the first network service, where the relationship is stored in the terminal, and the network service class is used to indicate network quality; and an access unit, configured to: if the network service class of the first network is lower than the network service class required for performing the first network service, access a second network, and perform the first network service by using the second network, where a network service class of the second network is higher than the network service class of the first network.

In a possible design, the determining unit is specifically configured to: monitor M quality of service parameters of each of N networks that are accessible to the terminal, where the M quality of service parameters include at least one of a delay, a jitter value, a bit error rate, a maximum transmission rate, a minimum transmission rate, or an average transmission rate, N is an integer greater than 1, and M is an integer greater than or equal to 1; and determine a network service class of each of the N networks according to the M quality of service parameters of each of the N networks, where the N networks include the first network and the second network.

In a possible design, the determining unit is specifically configured to: determine, for each of the N networks, whether each of the M quality of service parameters of each network meets a corresponding preset threshold condition; count a quantity of quality of service parameters that are in the M quality of service parameters and that meet the corresponding preset threshold condition; and determine the network service class of each of the N networks according to the quantity, where a larger quantity indicates higher network quality of service indicated by the network service class of the network.

Further, the terminal further includes a counting unit, where the counting unit is configured to count a first bandwidth occupancy rate in the second network, and the access unit is further configured to: if the first bandwidth occupancy rate is greater than a first threshold, access a WAN by simultaneously using the second network and at least one network different from the second network.

Further, the counting unit is further configured to: if the network service class of the first network is higher than or equal to the network service class required for performing the first network service, count a second bandwidth occupancy rate in the first network; and the access unit is further configured to: if the second bandwidth occupancy rate is greater than a second threshold, access a WAN by simultaneously using the first network and at least one network different from the first network.

Further, the determining unit is further configured to compare a tariff of the second network with a tariff of the first network; and the access unit is specifically configured to: if the tariff of the second network is lower than the tariff of the first network, access the second network.

Further, the determining unit is further configured to: if the tariff of the second network is higher than the tariff of the first network, determine a candidate network from the N networks that are accessible to the terminal, where a network service class of the candidate network is higher than the network service class of the first network, and a tariff of the candidate network is lower than the tariff of the second network; and use, by the terminal, the candidate network as the second network.

Further, the obtaining unit is specifically configured to obtain an IP packet of the first network service; and the determining unit is further configured to: parse a TOS field in the IP packet, and determine the priority of the first network service according to the TOS field.

According to a third aspect, an embodiment of the present invention provides a terminal, including a processor, a memory, a bus, and a radio frequency RF circuit, where the memory is configured to store a computer executable instruction, the processor is connected to the memory by using the bus, and when the terminal runs, the processor executes the computer executable instruction stored in the memory, so that the terminal executes the network access method according to any possible design of the first aspect.

According to a fourth aspect, an embodiment of the present invention provides a computer storage medium, configured to store a computer software instruction used by the foregoing terminal, where the computer storage medium includes a program designed for the terminal to execute the foregoing aspects.

In the present invention, a name of the foregoing terminal does not constitute a limitation on devices or function modules. In actual implementation, these devices or function modules may appear in other names. Provided that functions of the devices or function modules are similar to those in the present invention, the devices or function modules shall fall within the protection scope defined by the claims of the present invention and their equivalent technologies.

In addition, for the technical effects brought by any design manners of the second aspect to the fourth aspect, refer to the technical effects brought by the different design manners of the first aspect, and details are not described herein again.

These aspects or other aspects of the present invention are more concise and comprehensible in description of embodiments below.

BRIEF DESCRIPTION OF DRAWINGS

To describe the technical solutions in the embodiments of the present invention or in the prior art more clearly, the following briefly describes the accompanying drawings required for describing the embodiments or the prior art.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention.

In addition, the terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of the present invention, unless otherwise specified, "multiple" means two or more than two.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 1:
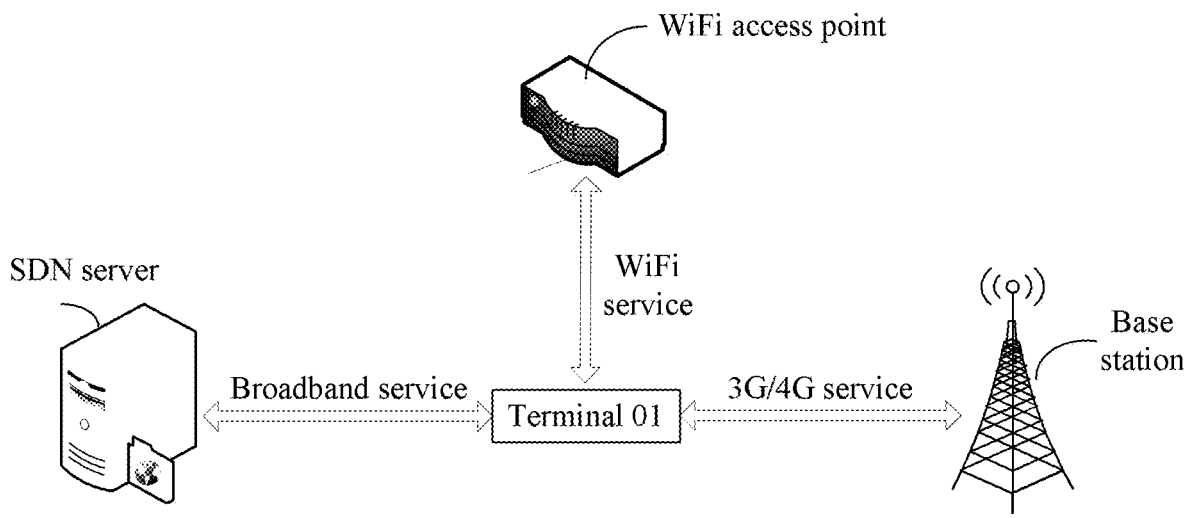
FIG. 1 is a schematic diagram 1 of an application scenario of a network access method according to an embodiment of the present invention.

As shown in FIG. 1, a terminal 01 may communicate with a WiFi access point (AP, Access Point) by using a WiFi service, so as to access a wireless network. Alternatively, a terminal 01 may communicate with a base station by using a 3G/4G service, so as to access a cellular network. Still alternatively, a terminal 01 may communicate with an SDN (Software Defined Network, software defined networking) server by using a broadband service, so as to access a fixed network. In this way, a user may use the terminal 01 to perform a network service such as a voice call or video downloading.

The wireless network, the cellular network, and the fixed network may be used as three different types of networks to provide various network services for the terminal.

It should be noted that the terminal 01 may be any terminal, such as a mobile phone, a router, or CPE (Customer Premise Equipment, customer premise equipment), that supports multiple networks. This is not limited in the present invention.

Figure 2:
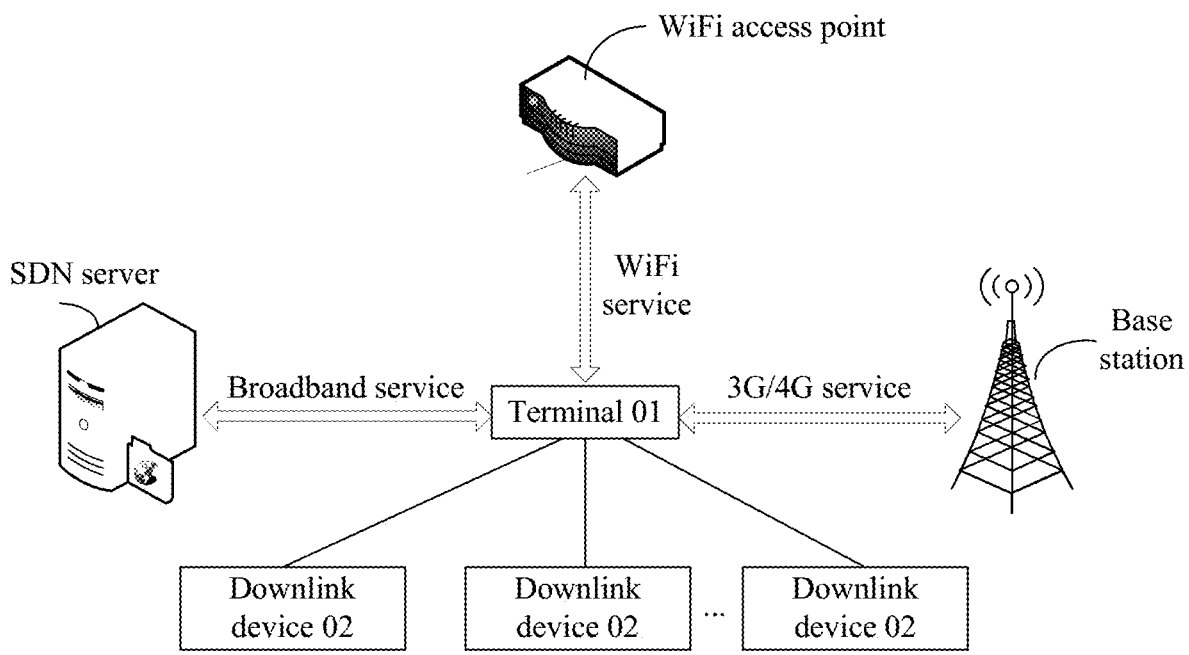
FIG. 2 is a schematic diagram 2 of an application scenario of a network access method according to an embodiment of the present invention.

It can be understood that, as shown in FIG. 2, after the terminal 01 accesses a network, the terminal 01 may be used as an uplink device to provide a network access service for a downlink device 02. For example, when the terminal 01 is a mobile phone, after the mobile phone accesses a cellular network by using a 4G service, the mobile phone may serve as an uplink device to use the mobile phone itself as a WiFi hotspot, so that the downlink device 02 such as another mobile phone or an iPad (a tablet computer) can access the WiFi hotspot by using the WiFi service, and then access the cellular network. In this case, the downlink device 02 may request a network service from the terminal 01. For example, when the user browses a web page by using the iPad, the iPad requests a web page browsing service from the terminal 01.

However, network quality of service (for example, a delay, a jitter value, a bit error rate, and a maximum transmission rate) provided by the different types of networks changes in real time. In addition, network quality of service that can be provided by the different types of networks at a same moment is different. As a result, after the terminal 01 accesses a type of network, once network quality of service that is provided by the current network deteriorates, or a service indicator required by each service that is requested from the terminal 01 is greater than an overall service indicator that can be provided by the network, a problem such as an intermittent stop or an interruption occurs when the terminal 01 or the downlink device 02, such as an iPad, served by the terminal 01 performs the network service.

In view of this, an embodiment of the present invention provides a network access method. In the network access method, the terminal 01 supports N (N>1) types of networks, and a correspondence between a priority of a network service and a network service class is established in the terminal 01. A network service class is used to indicate network quality. A higher network service class indicates higher network quality. For example, a priority of a web page browsing service is 1 (it is assumed that 1 is a lowest priority class), and a network service class corresponding to the priority 1 is 3 (that is, a lowest network service class); a priority of a voice call service is 4, and a network service class corresponding to the priority 4 is 1.

Assuming that a network currently used by the terminal 01 is a first network, the terminal 01 may periodically obtain network service classes of the N networks separately, and a network service class of each network may reflect network quality that can be provided by the network. In this way, when the terminal 01 or the downlink device 02 requests to perform a first network service, the terminal 01 obtains a priority of the to-be-performed first network service. Then, the terminal 01 determines, according to the correspondence between a network service priority and a network service class, a network service class required for performing the first network service, that is, a lowest network service class that meets a service indicator of the first network service. If the network service class of the current first network is lower than the network service class required for performing the first network service, that is, network quality indicated by the network service class of the first network cannot meet network quality required for performing the first network service, the first network service needs to be provided by a network with higher quality of service. Therefore, the terminal 01 accesses a second network with a higher network service class. A network service class of the second network is higher than the network service class of the first network. This ensures that the first network service does not encounter an intermittent stop, an interruption, or a like problem due to a change in network quality provided by the current first network or due to a limited overall service indicator that can be provided by the current first network.

For example, a mobile phone of a user supports two types of networks: a wireless network and a cellular network. After the user arrives home, the mobile phone may access the wireless network by using a WiFi service. In this case, the wireless network is the first network. The mobile phone may periodically obtain network service classes of the two types of networks. For example, a network service class of the cellular network is 1, and a network service class of the wireless network is 2. That is, network quality provided by the cellular network at this moment is higher than network quality provided by the wireless network at this moment. In this case, when the user makes a video call by using the mobile phone, the terminal 01 obtains a video call service request, that is, a video call service is the first network service. In this case, the terminal 01 obtains a priority of the video call service. For example, the priority of the video call service is 7, that is, a highest class. That is, network quality (for example, a transmission rate and a delay) required by the video call service is relatively high. The terminal 01 determines, according to the correspondence between a network service quality and a network service class, that a network service class required for performing the video call service is 1. The network service class (2) of the current wireless network is lower than the network service class (1) required for performing the video call service, that is, the network quality of the current wireless network cannot meet the video call service. Therefore, the terminal 01 accesses a network whose network service class is higher than the network service class of the wireless network, for example, switches from the wireless network to the cellular network whose network service class is 1.

Figure 3:
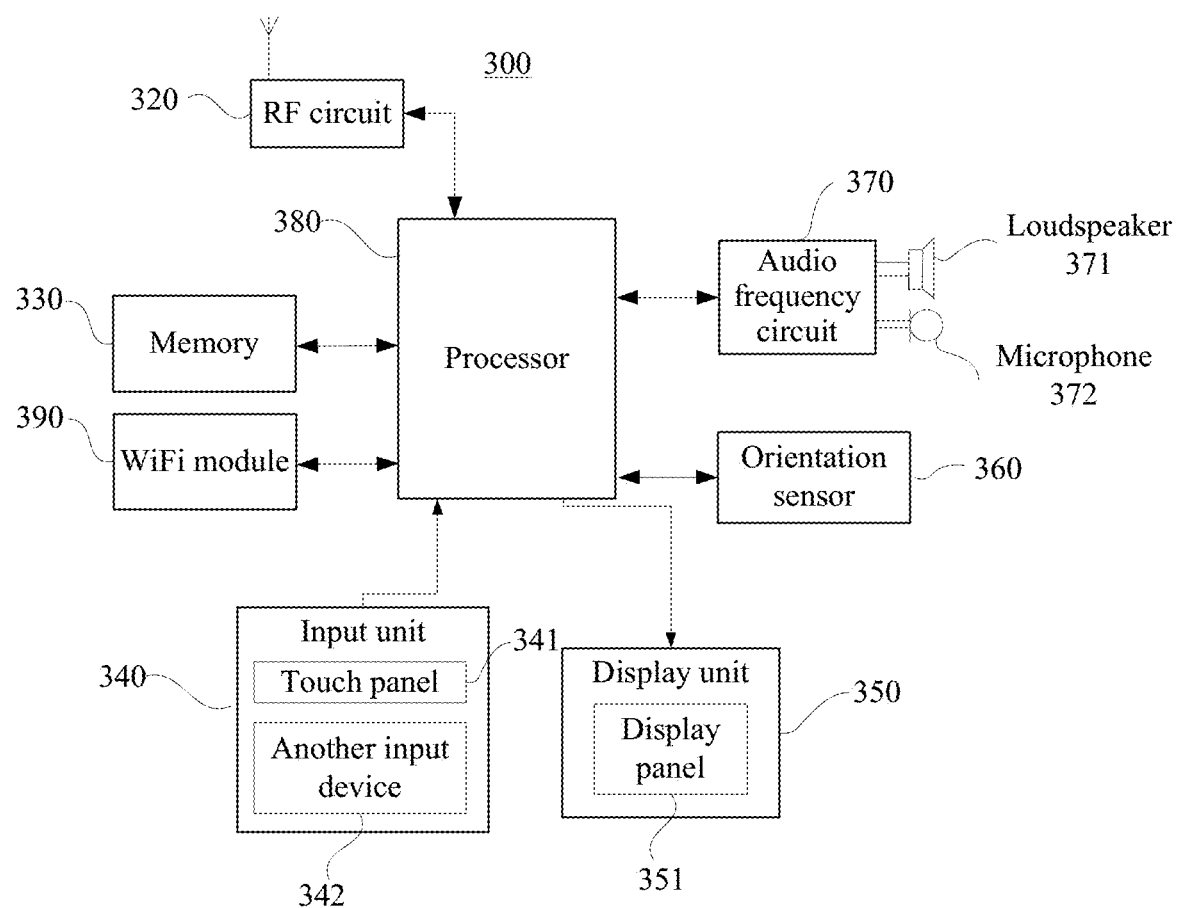
FIG. 3 is a schematic structural diagram of hardware of a terminal according to an embodiment of the present invention.

Further, FIG. 3 is a schematic structural diagram of a terminal 01 according to an embodiment of the present invention. The mobile terminal may be a mobile phone, a tablet computer, a notebook computer, a UMPC (Ultra-mobile Personal Computer, ultra-mobile personal computer), a netbook, a PDA (Personal Digital Assistant, personal digital assistant), or the like.

This embodiment of the present invention is described by using an example in which the mobile terminal is a mobile phone. FIG. 3 shows a block diagram of a partial structure of a mobile phone 300 related to each embodiment of the present invention.

As shown in FIG. 3, the mobile phone 300 includes components such as an RF (radio frequency, radio frequency) circuit 320, a memory 330, an input unit 340, a display unit 350, an orientation sensor 360, an audio frequency circuit 370, a processor 380, and a power supply 390. A person skilled in the art can understand that the structure of the mobile phone shown in FIG. 3 does not constitute a limitation on the mobile phone, and the mobile phone may include more or fewer components than those shown in the figure, or a combination of some components, or the components disposed differently.

The following describes each component of the mobile phone 300 in detail with reference to FIG. 3.

The RF circuit 320 may be configured to: send or receive information, send or receive a signal during a call, and specially, receive downlink information from a base station and send the downlink information to the processor 380 for processing; and additionally, send uplink data to the base station. Generally, the RF circuit includes but is not limited to an antenna, at least one amplifier, a transceiver, a coupler, an LNA (low noise amplifier, low noise amplifier), a duplexer, and the like. In addition, the RF circuit 320 may further communicate with a network and another device by means of wireless communications. Any communications standard or protocol may be used in wireless communications, including but not limited to GSM (global system of mobile communication, Global System for Mobile Communications), GPRS (general packet radio service, General Packet Radio Service), CDMA (code division multiple access, Code Division Multiple Access), WCDMA (wideband code division multiple access, Wideband Code Division Multiple Access), LTE (long term evolution, Long Term Evolution), email, an SMS (short messaging service, short message service), and the like.

The memory 330 may be configured to store a software program and a module. The processor 380 executes various function applications of the mobile phone 300 and processes data by running the software program and the module stored in the memory 330. The memory 330 may mainly include a program storage area and a data storage area. The program storage area may store an operating system, an application program required by at least one function (for example, a sound playback function and an image playback function), and the like. The data storage area may store data (for example, audio data, image data, and a phone book) created according to use of the mobile phone 300, and the like. In addition, the memory 330 may include a high-speed random access memory, and may further include a non-volatile memory, for example, at least one disk storage device, a flash memory device, or another volatile solid-state storage device.

The input unit 340 may be configured to: receive input digital or character information, and generate key signal input related to user setting and function control of the mobile phone 300. Specifically, the input unit 340 may include a touchscreen 341 and another input device 342. The touchscreen 341, also referred to as a touch panel, may collect a touch operation performed by a user on or near the touchscreen 341 (for example, an operation performed on the touchscreen 341 or near the touchscreen 341 by the user by using a finger, a stylus, or any suitable object or accessory), and drive a corresponding connection apparatus according to a preset program. Optionally, the touchscreen 341 may include two parts: a touch detection apparatus and a touch controller. The touch detection apparatus detects a touch position of the user, detects a signal generated by a touch operation, and transmits the signal to the touch controller. The touch controller receives touch information from the touch detection apparatus, converts the touch information into contact coordinates, and then sends the contact coordinates to the processor 380. The touch controller can also receive and execute a command sent by the processor 380. In addition, the touchscreen 341 may be implemented by using multiple types, such as a resistive type, a capacitive type, an infrared type, and a surface acoustic wave type. In addition to the touchscreen 341, the input unit 340 may include the another input device 342. Specifically, the another input device 342 may include but is not limited to one or more of a physical keyboard, a function key (for example, a volume control key or an on/off key), a trackball, a mouse, a joystick, or the like.

The display unit 350 may be configured to display information entered by the user or information provided for the user, and various menus of the mobile phone 300. The display unit 350 may include a display panel 351. Optionally, the display panel 341 may be configured in a form of an LCD (Liquid Crystal Display, liquid crystal display), an OLED (Organic Light-Emitting Diode, organic light-emitting diode), or the like. Further, the touchscreen 341 may cover the display panel 351. After a touch operation on or near the touchscreen 341 are detected, the touchscreen 341 transmits information about the touch operation to the processor 380 to determine a touch event type. Then, the processor 380 provides corresponding visual output on the display panel 351 according to the touch event type. In FIG. 3, the touchscreen 341 and the display panel 351 are used as two independent components to implement input and output functions of the mobile phone 300. However, in some embodiments, the touchscreen 341 and the display panel 351 may be integrated to implement the input and output functions of the mobile phone 300.

The orientation sensor 360, for example, an acceleration sensor or a gravity sensor (gravity sensor), may detect accelerations of the mobile phone in various directions (generally three axes), may detect, in a still state, a value and a direction of gravity, and may be used for an application for identifying accelerations of the mobile phone in the various directions (such as screen switching between a landscape mode and a portrait mode, a related game, and magnetometer posture calibration), a vibration-recognition-related function (such as a pedometer or stroking), and the like.

The mobile phone 300 may further include another sensor such as a light sensor. Specifically, the light sensor may include an ambient light sensor and an optical proximity sensor. The ambient light sensor may adjust luminance of the display panel 341 according to brightness of ambient light. The optical proximity sensor may detect whether an object is approaching or touching the mobile phone, and may turn off the display panel 341 and/or backlight when the mobile phone 300 moves to an ear. Other sensors such as a gyroscope, a barometer, a hygrometer, a thermometer, and an infrared sensor that may be configured in the mobile phone 300 are not described herein.

The audio circuit 370, a loudspeaker 371, and a microphone 372 may provide an audio interface between the user and the mobile phone 300. The audio frequency circuit 370 may transmit, to the loudspeaker 371, an electrical signal that is obtained by converting received audio data, and the loudspeaker 371 converts the electrical signal into a sound signal and outputs the sound signal. In addition, the microphone 372 converts a collected sound signal into an electrical signal, and the audio frequency circuit 370 receives the electrical signal, converts the electrical signal into audio data, and then outputs the audio data to the RF circuit 320, so that the audio data is sent to, for example, another mobile phone, or the audio data is output to the memory 330 for further processing.

A WiFi module 390 may enable access of the mobile phone 300 to a WAN in a wireless manner, for example, in a WiFi mode.

The processor 380 is a control center of the mobile phone 300, is connected to various parts of the entire mobile phone by using various interfaces and lines, and executes various functions of the mobile phone 300 and processes data by running or executing the software program and/or module stored in the memory 330 and invoking data stored in the memory 330, so as to monitor the entire mobile phone. Optionally, the processor 380 may include one or more processing units. Preferably, an application processor and a modem processor may be integrated into the processor 380. The application processor mainly processes an operating system, a user interface, an application program, and the like. The modem processor mainly deals with wireless communications. It can be understood that the modem processor may alternatively be not integrated into the processor 380.

Although not shown, the mobile phone 300 may further include a Bluetooth module and the like, and details are not described herein.

In this embodiment of the present invention, the memory 330 stores a correspondence between a priority of a service and a network service class. Specifically, the mobile phone 300 may support multiple services such as a web page browsing service and a video call service; separately determine, according to different service indicators, priorities of these services and quality of service required by these services; and then, establish the correspondence between a priority of a service and a network service class in the memory 330.

In this way, in the network access method according to the embodiment of the present invention, the processor 380 may obtain a priority of a first network service by invoking the RF circuit 320, and then, determine, according to the correspondence between a priority of a service and a network service class that is stored in the memory 330, a network service class required for performing the first network service. If a network service class of a current first network is lower than the network service class required for performing the first network service, the processor 380 accesses a second network. A network service class of the second network is higher than the network service class of the first network, ensuring that the first network service does not encounter an intermittent stop, an interruption, or a like problem due to a change in network quality of the current first network or due to a limited overall service indicator that can be provided by the first network.

Figure 4:
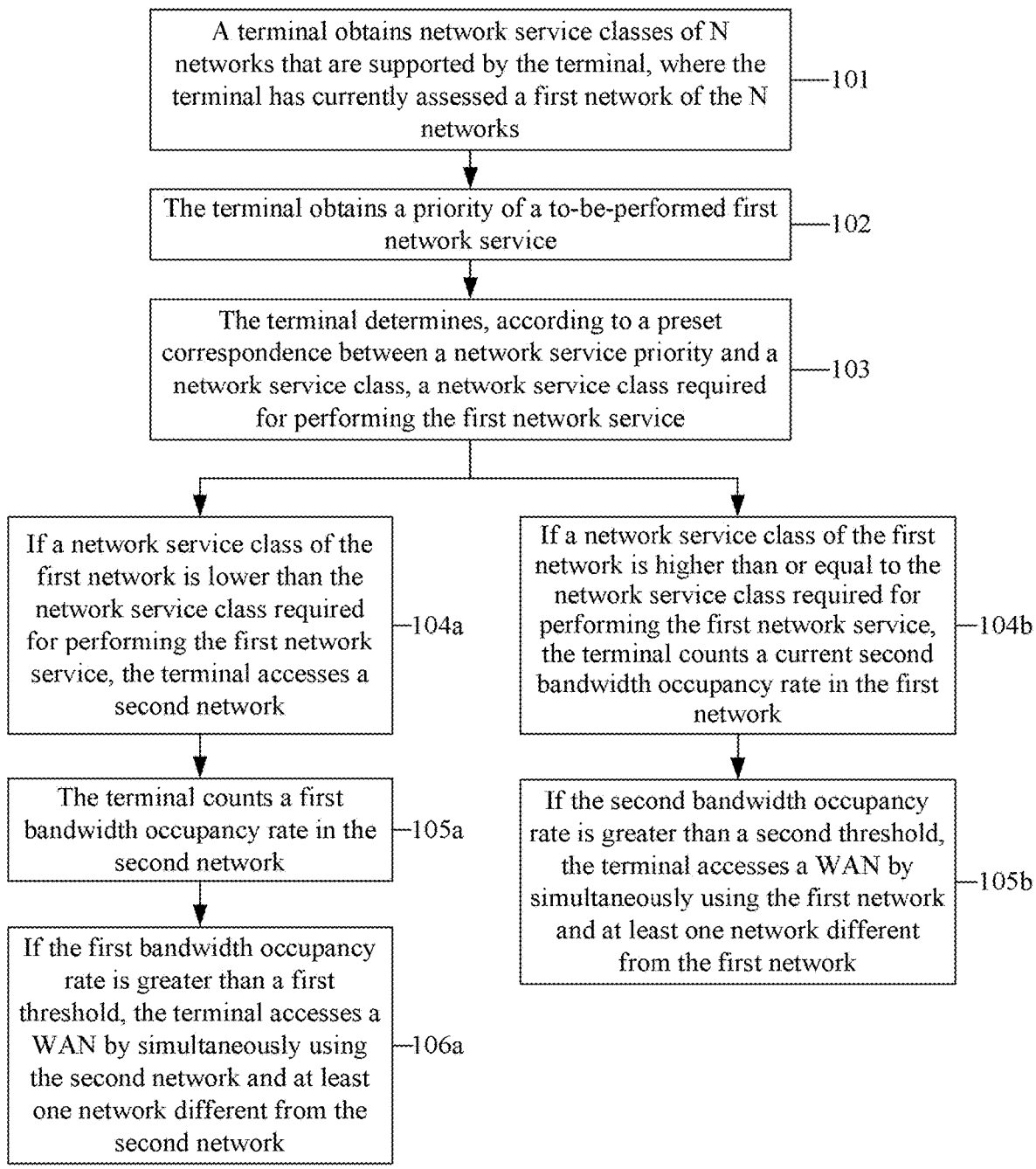
FIG. 4 is a schematic flowchart 1 of a network access method according to an embodiment of the present invention.

A network access method provided in an embodiment of the present invention is described in detail below with reference to FIG. 3. As shown in FIG. 4, the method includes the following steps.

101. A terminal obtains network service classes of N networks that are supported by the terminal, where the terminal has currently accessed a first network of the N networks, and N is an integer greater than 1.

Specifically, for each of the N networks that are supported by the terminal, the terminal may monitor M quality of service parameters of the network. The M quality of service parameters include at least one of a delay, a jitter value, a bit error rate, a maximum transmission rate, a minimum transmission rate, or an average transmission rate, and M is an integer greater than or equal to 1. Then, the terminal determines a network service class of the network according to the M quality of service parameters, and finally obtains a network service class of each of the N networks. In this embodiment of the present invention, a network service class of 1 is higher than a network service class of 2, and a higher network service class indicates higher network quality that can be provided by the network.

For example, in a cellular network, the terminal may send a probe data packet to a base station, to detect a total of four quality of service parameters: a delay, a jitter value, a bit error rate, and a maximum transmission rate. In addition, a threshold condition for each of the fourth quality of service parameters is preset in the terminal. For example, a threshold condition for the delay is: The detected delay is less than 0.8 millisecond; and a threshold condition for the maximum transmission rate is: The detected maximum transmission rate is greater than 800 K/s.

Therefore, the terminal may determine whether each quality of service parameter meets a corresponding threshold condition, and then count a quantity of quality of service parameters that meet the corresponding threshold condition. For example, two quality of service parameters: the delay and the maximum transmission rate, meet corresponding threshold conditions, that is, the quantity is 2. In this way, the terminal may determine a network service class of the cellular network according to the quantity. A larger quantity indicates a higher network service class of the cellular network, or higher network quality of service reflected by the network service class of the cellular network. For example, when all of the four quality of service parameters meet corresponding threshold conditions, the terminal determines that the network service class of the cellular network is 1, a highest class; when three of the four quality of service parameters meet corresponding threshold conditions, the terminal determines that the network service class of the cellular network is 2; or the like.

Certainly, a method for obtaining a network service class of a network is not limited in this embodiment of the present invention. It can be understood that a person skilled in the art may determine, according to real experience or an algorithm, a network service class of a network by using various quality of service parameters.

For example, a weight may be set for each of the M quality of service parameters. In this way, the terminal may score the monitored M quality of service parameters according to the weight of each quality of service parameter, and then determine the network service class of the network according to a scoring result.

With reference to FIG. 3, in step 101, the processor 380 in the terminal may obtain the network service classes of the N networks by invoking the RF circuit 300 and the program stored in the memory 330.

102. The terminal obtains a priority of a to-be-performed first network service.

As shown in FIG. 1 or FIG. 2, after the terminal accesses the first network, the terminal itself may request to perform the first network service such as song downloading, a video call, or a voice call. A downlink device of the terminal may also request the terminal to perform the first network service. In this case, the terminal obtains an IP packet of the first network service, and further parses a TOS (Type of Service, type of service) field in the IP packet. Because the TOS field is used to indicate the priority of the first network service, the terminal may determine the priority of the first network service according to the parsed TOS field.

As listed in Table 1, Table 1 lists network services (including the first network service) corresponding to different values of the $0^{th}$ to $5^{th}$ bits of the TOS field in the IP packet specified in the IP protocol and priorities of the services. A DSCP (Differentiated Services Code Point, differentiated services code point) is a code of each network service. Values of the priorities include 0 to 6, and a larger value indicates a higher priority. In this way, the terminal may obtain the priority of the first network service according to Table 1.

TABLE 1

| DSCP | $0^{th}$ to $5^{th}$ bits of the TOS field | Priority |
| --- | --- | --- |
| CS0 | 000 000 | 0 |
| CS1 | 001 000 | 1 |
| AF11 | 001 010 | 1 |
| AF12 | 001 100 | 1 |
| AF13 | 001 110 | 1 |
| CS2 | 010 000 | 2 |
| AF21 | 010 010 | 2 |
| AF22 | 010 100 | 2 |
| AF23 | 010 110 | 2 |
| CS3 | 011 000 | 3 |
| AF31 | 011 010 | 3 |
| AF32 | 011 100 | 3 |
| AF33 | 011 110 | 3 |
| CS4 | 100 000 | 4 |
| AF41 | 100 010 | 4 |
| AF42 | 100 100 | 4 |
| AF43 | 100 110 | 4 |
| CS5 | 101 000 | 5 |
| EF | 101 110 | 5 |
| CS6 | 110 000 | 6 |

With reference to FIG. 3, in step 102, the processor 380 in the terminal may obtain the priority of the to-be-performed first network service by invoking the RF circuit 300 and the program stored in the memory 330.

103. The terminal determines, according to a preset correspondence between a network service quality and a network service class, a network service class required for performing the first network service.

Specifically, the correspondence between a network service quality and a network service class is stored in the terminal. The priority of the network service may be corresponding to the network service class in a one-to-one manner. Alternatively, a priority within a specific value range may be corresponding to a specific network service class.

For example, as listed in Table 2, Table 2 presents a correspondence between a priority (that is, the priorities 0 to 6) of a network service and a network service class in Table 1. For example, when a priority of a web page browsing service is within [0,2], the web page browsing service is corresponding to a network service class of 3. That is, any network whose network service class is 3 can meet a service indicator required by the web page browsing service.

TABLE 2

| Value range of a priority | Network service class |
|---|---|
| [0,2] | 3 |
| [3,4] | 2 |
| [5,6] | 1 |

Because the terminal has determined the priority of the first network service in step 102, with reference to the correspondence between a priority of a service and a network service class in Table 2, the terminal may determine the network service class required for performing the first network service, that is, a lowest network service class that meets a service indicator of the first network service.

Further, because the terminal obtains the network service classes of the N networks in step 101, with reference to the correspondence between a network service priority and a network service class, the terminal may determine a correspondence between a network service priority, a network service class, and the N networks. For example, as listed in Table 3, Table 3 presents a correspondence between a network service priority, a network service class, and three networks.

Certainly, because network quality of the N networks changes in real time, the terminal may modify a correspondence between network service classes and different networks in Table 3 according to the network service class of each network that is obtained in step 101.

TABLE 3

| Value range of a priority | Network service class | N networks |
|---|---|---|
| [0,2] | 3 | Wireless network |
| [3,4] | 2 | Cellular network |
| [5,6] | 1 | Fixed network |

Based on the correspondence between the N networks and each network service priority, and the network service class that is required by the first network service and that is determined in step 102, the terminal can determine whether the network service class of the first network is higher than the network service class required for performing the first network service, and determine whether network quality provided by the current first network meets network quality required for performing the first network service. For example, the first network is a wireless network, the first network service is a video downloading service, the priority of the first network service is 4, and a network service class corresponding to the priority of the first network service (for example, a first network service class) is 2. Therefore, it may be determined according to Table 3 that, when a network is in a data mode or a fixed network mode, a requirement of the first network service for quality of service can be met. However, the network service class of the current first network is 3, and obviously, the network service class of the first network is lower than the first network service class, that is, the network service class required for performing the first network service.

With reference to FIG. 3, in step 103, the processor 380 in the terminal may determine, by invoking the correspondence between a network service priority and a network service class that is stored in the memory 330, the network service class required for performing the first network service.

104a. If a network service class of the first network is lower than the network service class required for performing the first network service, the terminal accesses a second network.

A network service class of the second network is higher than the network service class of the first network.

The example in step 103 is still used for description. If a network currently used by the terminal is the wireless network, that is, the first network is the wireless network, a network service class of the wireless network is 3, and the first network service class required for performing the first network service is 2.

That is, current quality of service of the wireless network does not allow the terminal to perform the first network service. Then, if the terminal still uses the wireless network to perform the first network service, a problem such as an intermittent stop or even a service interruption occurs. Therefore, the terminal may access the second network with a higher network service class in this case. That is, the network service class of the second network should be higher than or equal to the first network service class, so that a service indicator required for performing the first network service by the terminal can be met.

It should be noted that, when the terminal accesses the second network, the terminal may access the second network only, or access both the first network and the second network. This is not limited in this embodiment of the present invention.

With reference to FIG. 3, in step 104a, the processor 380 in the terminal may access different networks by invoking different network modules such as the WiFi module 390.

105a. The terminal counts a first bandwidth occupancy rate in the second network.

Because bandwidth that can be provided by the terminal in different networks is limited, to meet bandwidth requirements of all network services (including the first network service) running in the terminal, the terminal counts the first bandwidth occupancy rate in the second network after accessing the second network.

106a. If the first bandwidth occupancy rate is greater than a first threshold, the terminal accesses a WAN (Wide Area Network, wide area network) by simultaneously using the second network and at least one network different from the second network.

Correspondingly, in step 106a, when the first bandwidth occupancy rate is greater than the first threshold, the terminal can access the WAN by simultaneously using the second network and the at least one network different from the second network, to meet the bandwidth requirements of all the network services running in the terminal.

For example, total bandwidth that can be provided by the terminal in the second network (the second network is the cellular network) is 4 M, a web page browsing service and a voice service are already running in the terminal, and after the first network service is added, the first bandwidth occupancy rate in the second network is greater than the first threshold 95%. In this case, the terminal may access the fixed network and/or the wireless network in addition to the second network, so as to ensure that the terminal can provide bandwidth that meets the foregoing three services.

With reference to FIG. 3, the processor 380 in the terminal may execute step 105a and step 106a by invoking the program in the memory 330.

104b. If the network service class of the first network is higher than or equal to the network service class required for performing the first network service, the terminal counts a current second bandwidth occupancy rate in the first network.

Corresponding to step 104a, in step 104b, if the network service class of the first network is higher than or equal to the network service class required for performing the first network service, that is, network quality that is provided by the first network being used by the terminal can meet a service indicator of the first network service, the terminal does not need to access another network.

The example in step 103 is still used for description. As listed in Table 3, if the terminal currently accesses the cellular network, that is, the first network is the cellular network, the network service class of the cellular network is 2, and the network service class required for performing the first network service is 3, that is, the network service class of the first network is higher than the network service class required for performing the first network service. That is, network quality that is currently provided by the cellular network can meet a service indicator required for performing the first network service by the terminal. Therefore, the terminal does not need to access another network, and can continue to use the first network to perform the first network service.

In addition, because the first network service is added, to meet the bandwidth requirements of all the network services running in the terminal, the terminal counts the current second bandwidth occupancy rate in the first network.

105b. If the second bandwidth occupancy rate is greater than a second threshold, the terminal accesses a WAN by simultaneously using the first network and at least one network different from the first network.

Similar to step 106a, when the second bandwidth occupancy rate is greater than the second threshold, the terminal can access the WAN by simultaneously using the second network and the at least one network different from the second network, to meet the bandwidth requirements of all the network services running in the terminal.

With reference to FIG. 3, the processor 380 in the terminal may execute step 104b and step 105b by invoking the program in the memory 330.

The terminal may periodically obtain the network service classes of the N networks that are supported by the terminal, determine a real-time change in the network quality provided by the N networks, and further adjust, in real time according to the foregoing network access method, a network accessed by the terminal, to ensure that the terminal can continuously provide a network with stable network quality for each network service.

Further, tariffs for using different networks are generally different. For example, a tariff of the cellular network is calculated according to data transmission traffic, and is generally high. A tariff of the fixed network such as fiber broadband is generally lower than the tariff of the cellular network, and the wireless network is generally free of charge.

Therefore, when the terminal executes step 104a, that is, the terminal switches from the first network already accessed by the terminal to the second network, the terminal may further select a network with a low tariff for a user according to the tariffs of the different networks, so as to implement an intelligent switch between the different networks.

Figure 5:
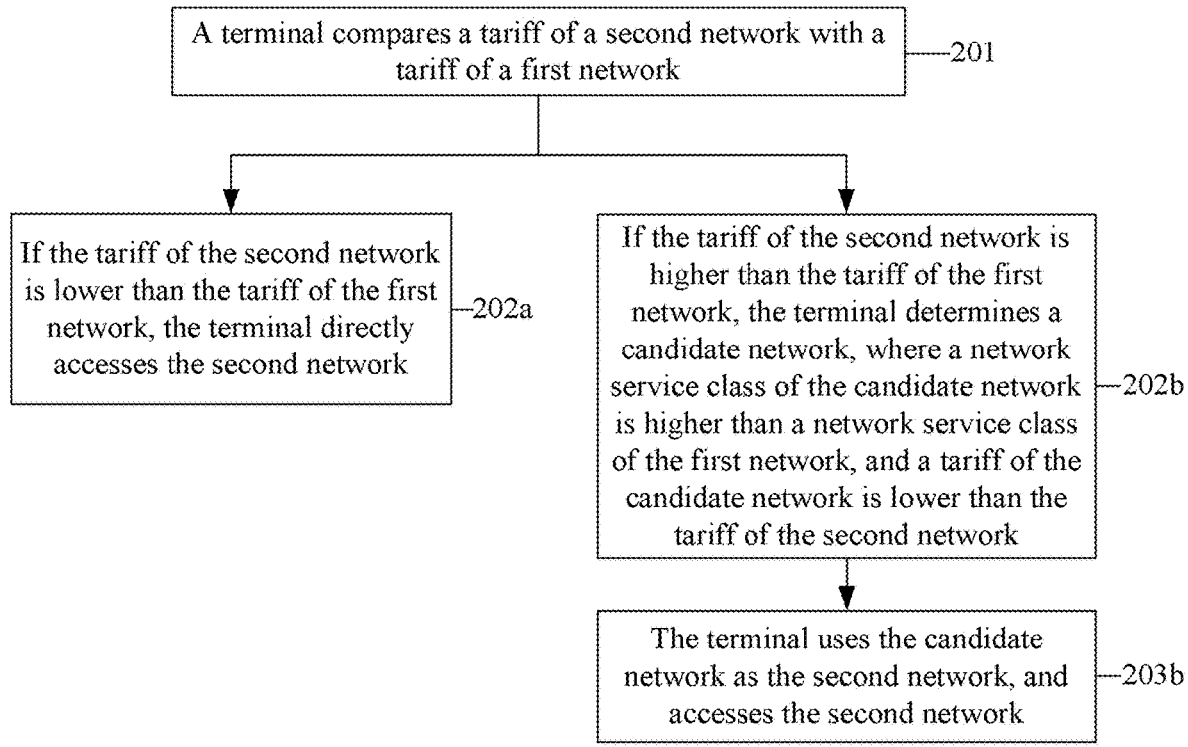
FIG. 5 is a schematic flowchart 2 of a network access method according to an embodiment of the present invention.

In view of this, for example, an embodiment of the present invention provides a specific method for accessing a second network by a terminal. As shown in FIG. 5, the method includes the following steps.

201. The terminal compares a tariff of the second network with a tariff of the first network.

Specifically, when determining that a network required for performing the first network service is the second network with a higher network service class, the terminal compares the tariff of the second network with the tariff of the currently used first network.

202a. If the tariff of the second network is lower than the tariff of the first network, the terminal directly accesses the second network.

In step 202a, when the tariff of the second network is lower than the tariff of the first network, the terminal may directly access the second network. This can ensure that the terminal provides relatively high network quality for the first network service, and can also reduce a network access expense of a user.

202b. If the tariff of the second network is higher than the tariff of the first network, the terminal determines a candidate network, where a network service class of the candidate network is higher than the network service class of the first network, and a tariff of the candidate network is lower than the tariff of the second network.

Contrary to step 202a, if the tariff of the second network is higher than the tariff of the first network, because the network service class of the first network is lower than the network service class required for performing the first network service, that is, the network service class required for performing the first network service should be higher than the network service class of the first network, to ensure relatively high quality of service for the first network service, the terminal needs to select a network whose network service class is higher than the network service class of the first network. In addition, to reduce the network access expense of the user, the terminal needs to select a network whose tariff is lower than the tariff of the second network, that is, the candidate network.

The example in step 103 is still used for description. If the network currently accessed by the terminal is the wireless network, that is, the first network is the wireless network, the network service class required for performing the first network service is 3, the second network is the cellular network whose network service class is 2, and the tariff of the second network is higher than the tariff of the first network. In this case, if the terminal still uses the currently used first network to perform the first network service, a problem such as an intermittent stop or even a service interruption occurs. If the terminal performs the first network service by using the second network, the expense is higher. Therefore, the terminal selects a network with a network service class higher than that of the first network and a tariff lower than that of the second network, for example, the fixed network in Table 3, as a candidate network to be switched to.

203b. The terminal uses the candidate network as the second network, and accesses the second network.

In this case, the terminal uses the candidate network as the to-be-accessed second network, and then accesses the second network, so as to provide relatively high network quality for the first network service while reducing the network access expense of the user.

With reference to FIG. 3, the processor 380 in the terminal may execute step 201 to step 203b by invoking the program in the memory 330.

This embodiment of the present invention provides a network access method. In the network access method, the correspondence between a network service priority and a network service class is established in the terminal. Assuming that the currently used network is the first network, when the terminal is requested to perform the first network service, the terminal obtains the priority of the to-be-performed first network service. In this way, the terminal determines, according to the correspondence between a network service priority and a network service class, the network service class required for performing the first network service, that is, the lowest network service class that meets the service indicator of the first network service. If the network service class of the first network is lower than the network service class required for performing the first network service, that is, the network quality indicated by the network service class of the first network cannot meet the network quality required for performing the first network service, the terminal accesses the second network whose network service class is higher than the network service class of the first network. This ensures that the first network service does not encounter an intermittent stop, an interruption, or a like problem due to a change in network quality provided by the current first network or due to a limited overall service indicator that can be provided by the current first network.

Figure 6:
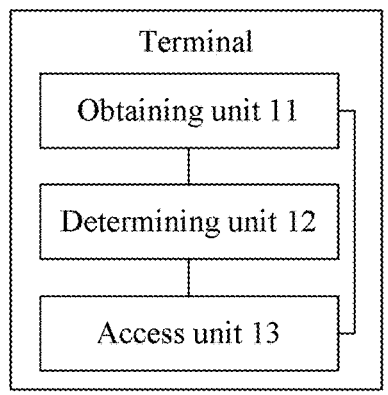
FIG. 6 is a schematic structural diagram 1 of a terminal according to an embodiment of the present invention.

FIG. 6 is a schematic structural diagram of a terminal according to an embodiment of the present invention. The terminal provided in this embodiment of the present invention may be used to implement the methods implemented in the embodiments of the present invention shown in FIG. 1 to FIG. 5. For ease of description, only a part related to this embodiment of the present invention is illustrated. For specific technical details not disclosed, refer to the embodiments of the present invention shown in FIG. 1 to FIG. 5.

The terminal may be specifically a mobile phone, a router, or the like that supports N (N is an integer greater than 1) networks. This is not limited in the present invention, and all hardware products that can meet an operation capability requirement may be used.

Specifically, the terminal includes:

an obtaining unit 11, configured to: obtain a priority of a to-be-performed first network service, and obtain a network service class of a first network currently accessed by the terminal;

a determining unit 12, configured to determine, according to a relationship between a network service priority and a network service class, a network service class required for performing the first network service, where the relationship is stored in the terminal, and the network service class is used to indicate network quality; and an access unit 13, configured to: if the network service class of the first network is lower than the network service class required for performing the first network service, access a second network, and perform the first network service by using the second network.

A network service class of the second network is higher than the network service class of the first network.

Further, the obtaining unit 11 is further configured to monitor, by the terminal, M quality of service parameters of each of N networks that are accessible to the terminal. The M quality of service parameter includes at least one of a delay, a jitter value, a bit error rate, a maximum transmission rate, a minimum transmission rate, or an average transmission rate, N is an integer greater than 1, and M is an integer greater than or equal to 1.

The determining unit 12 is further configured to determine a network service class of each of the N networks according to the M quality of service parameters of each of the N networks. The N networks include the first network and the second network.

Further, the determining unit 12 is specifically configured to: determine, for each of the N networks, whether each of the M quality of service parameters of each network meets a corresponding preset threshold condition; count a quantity of quality of service parameters that are in the M quality of service parameters and that meet the corresponding preset threshold condition; and determine the network service class of each of the N networks according to the quantity. A larger quantity indicates higher network quality of service indicated by the network service class of the network.

Figure 7:
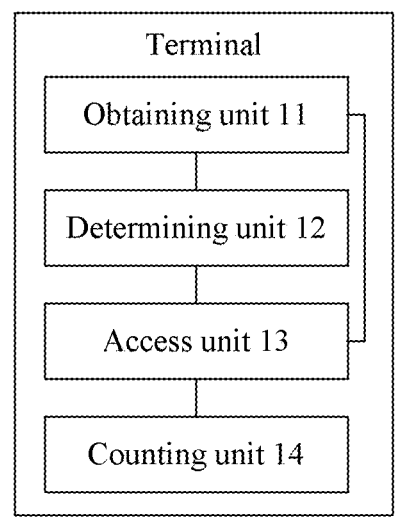
FIG. 7 is a schematic structural diagram 2 of a terminal according to an embodiment of the present invention.

Further, as shown in FIG. 7, the terminal further includes a counting unit 14.

The counting unit 14 is configured to count a first bandwidth occupancy rate in the second network.

The access unit 13 is further configured to: if the first bandwidth occupancy rate is greater than a first threshold, access a WAN by simultaneously using the second network and at least one network different from the second network.

Further, the counting unit 14 is further configured to: if the network service class of the first network is higher than or equal to the network service class required for performing the first network service, count a second bandwidth occupancy rate in the first network.

The access unit 13 is further configured to: if the second bandwidth occupancy rate is greater than a second threshold, access a WAN by simultaneously using the first network and at least one network different from the first network.

Further, the determining unit 12 is further configured to compare a tariff of the second network with a tariff of the first network.

The access unit 13 is specifically configured to: if the tariff of the second network is lower than the tariff of the first network, access the second network.

Further, the determining unit 12 is further configured to: if the tariff of the second network is higher than the tariff of the first network, determine a candidate network from the N networks that are accessible to the terminal, where a network service class of the candidate network is higher than the network service class of the first network, and a tariff of the candidate network is lower than the tariff of the second network; and use the candidate network as the second network.

Further, the obtaining unit 11 is specifically configured to obtain an IP packet of the first network service.

The determining unit 12 is further configured to: parse a TOS field in the IP packet, and determine the priority of the first network service according to the TOS field.

This embodiment of the present invention provides a terminal. The correspondence between a network service priority and a network service class is established in the terminal. Assuming that a currently used network is the first network, when the terminal is requested to perform the first network service, the terminal obtains the priority of the to-be-performed first network service. In this way, the terminal determines, according to the correspondence between a network service priority and a network service class, the network service class required for performing the first network service, that is, the lowest network service class that meets the service indicator of the first network service. If the network service class of the first network is lower than the network service class required for performing the first network service, that is, the network quality indicated by the network service class of the first network cannot meet the network quality required for performing the first network service, the terminal accesses the second network whose network service class is higher than the network service class of the first network. This ensures that the first network service does not encounter an intermittent stop, an interruption, or a like problem due to a change in network quality provided by the current first network or due to a limited overall service indicator that can be provided by the current first network.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, a network device, or the like) or a processor (processor) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A network access method implemented by a terminal and comprising:
   obtaining a priority of a first network service;
   determining, according to a relationship between the priority and a network service class and stored in the terminal, the network service class required for performing the first network service, wherein the relationship indicates a correspondence between a value range of the priority and the network service class, and wherein the network service class indicates a network quality;
   obtaining a first network service class of a first network currently accessed by the terminal;
   accessing a second network when the first network service class is lower than the network service class;
   performing the first network service using the second network when the first network service class is lower than the network service class, wherein a second network service class of the second network is higher than the first network service class;
   counting a first bandwidth occupancy rate in the second network; and
   accessing a wide area network (WAN) by simultaneously using the second network and at least one network different from the second network when the first bandwidth occupancy rate is greater than a first threshold.

2. The method of claim 1, further comprising:
   monitoring M quality of service parameters of each of N networks accessible to the terminal, wherein the M quality of service parameters comprise at least one of a delay, a jitter value, a bit error rate, a maximum transmission rate, a minimum transmission rate, or an average transmission rate, wherein N is an integer greater than 1, and wherein M is an integer greater than or equal to 1; and
   determining a network service class of each of the N networks according to the M quality of service parameters of each of the N networks, wherein the N networks comprise the first network and the second network.

3. The method of claim 2, wherein determining, by the terminal, the network service class of each of the N networks comprises:
   determining, for each of the N networks, whether each of the M quality of service parameters of each network meets a corresponding preset threshold condition;
   counting a quantity of quality of service parameters in the M quality of service parameters meeting the corresponding preset threshold condition; and
   determining a network service class of each of the N networks according to the quantity of quality of service parameters, wherein a larger quantity of quality of service parameters indicates higher network quality of service indicated by the network service class of the network.

4. The method of claim 1, further comprising:
   counting a second bandwidth occupancy rate in the first network when the first network service class is higher than or equal to the network service class required for performing the first network service; and
   accessing a wide area network (WAN) by simultaneously using the first network and at least one network different from the first network when the second bandwidth occupancy rate is greater than a second threshold.

5. The method of claim 1, wherein accessing, by the terminal, the second network comprises:

comparing a second tariff of the second network with a first tariff of the first network; and
accessing the second network when the second tariff is lower than the first tariff.

6. The method of claim 5, further comprising:
determining a candidate network from the N networks accessible to the terminal when the second tariff is higher than the first tariff, wherein a network service class of the candidate network is higher than the first network service class of the first network, and wherein a tariff of the candidate network is lower than the second tariff;
using the candidate network as the second network; and
accessing the second network.

7. The method of claim 1, wherein obtaining the priority of the first network service comprises:
obtaining an internet protocol (IP) packet of the first network service;
parsing a type of service (TOS) field in the IP packet; and
determining the priority of the first network service according to the TOS field.

8. A terminal, comprising:
a memory;
a bus;
a radio frequency RF circuit coupled to the memory using the bus and configured to:
obtain a priority of a first network service; and
obtain a first network service class of a first network currently accessed by the terminal; and
a processor coupled to the memory and the RF circuit using the bus and configured to:
determine, according to a relationship between the priority and a network service class and stored in the memory, the network service class required for performing the first network service, wherein the relationship indicates a correspondence between a value range of the priority and the network service class, and wherein the network service class indicates a network quality;
access a second network when the first network service class is lower than the network service class;
perform the first network service using the second network when the first network service class is lower than the network service class, wherein a second network service class of the second network is higher than the first network service class;
count a first bandwidth occupancy rate in the second network; and
access a wide area network (WAN) by simultaneously using the second network and at least one network different from the second network when the first bandwidth occupancy rate is greater than a first threshold.

9. The terminal of claim 8, wherein the RF circuit is further configured to monitor M quality of service parameters of each of N networks accessible to the terminal, wherein the M quality of service parameters comprise at least one of a delay, a jitter value, a bit error rate, a maximum transmission rate, a minimum transmission rate, or an average transmission rate, wherein N is an integer greater than 1, wherein M is an integer greater than or equal to 1, wherein the processor is further configured to determine a network service class of each of the N networks according to the M quality of service parameters of each of the N networks, and wherein the N networks comprise the first network and the second network.

10. The terminal of claim 9, wherein in a manner of determining the network service class of each of the N networks, the processor is further configured to:
determine, for each of the N networks, whether each of the M quality of service parameters of each network meets a corresponding preset threshold condition;
count a quantity of quality of service parameters in the M quality of service parameters meeting the corresponding preset threshold condition; and
determine a network service class of a network according to the quantity of quality of service parameters, wherein a larger quantity of quality of service parameters indicates higher network quality of service indicated by the network service class of the network.

11. The terminal of claim 8, wherein the processor is further configured to:
count a second bandwidth occupancy rate in the first network when the network service class of the first network is higher than or equal to the network service class required for performing the first network service; and
access a wide area network (WAN) by simultaneously using the first network and at least one network different from the first network when the second bandwidth occupancy rate is greater than a second threshold.

12. The terminal of claim 8, wherein the processor is further configured to:
compare a second tariff of the second network with a first tariff of the first network; and
access the second network when the second tariff is lower than the first tariff.

13. The terminal of claim 12, wherein the processor is further configured to:
determine a candidate network from the N networks accessible to the terminal when the second tariff is higher than the first tariff, wherein a network service class of the candidate network is higher than the first network service class of the first network, and wherein a tariff of the candidate network is lower than the second tariff;
use the candidate network as the second network; and
access the second network.

14. The terminal of claim 8, wherein the RF circuit is further configured to obtain an internet protocol (IP) packet of the first network service, and wherein the processor is further configured to:
parse a type of service (TOS) field in the IP packet; and
determine the priority of the first network service according to the TOS field.

15. A computer program product comprising instructions for storage on a non-transitory medium and that, when executed by a processor, cause an apparatus to:
obtain a priority of a first network service;
determine, according to a relationship between the priority and a network service class and stored in the terminal, the network service class required for performing the first network service, wherein the relationship indicates a correspondence between a value range of the priority and the network service class, and wherein the network service class indicates a network quality;
obtain a first network service class of a first network currently accessed by the terminal;
access a second network when the first network service class is lower than the network service class;
perform the first network service using the second network when the first network service class is lower than the network service class, wherein a second network service class of the second network is higher than the first network service class;

count a first bandwidth occupancy rate in the second network; and access a wide area network (WAN) by simultaneously using the second network and at least one network different from the second network when the first bandwidth occupancy rate is greater than a first threshold.

16. The computer program product of claim 15, wherein the instructions further cause the apparatus to:

monitor M quality of service parameters of each of N networks accessible to the terminal, wherein the M quality of service parameters comprise at least one of a delay, a jitter value, a bit error rate, a maximum transmission rate, a minimum transmission rate, or an average transmission rate, wherein N is an integer greater than 1, and wherein M is an integer greater than or equal to 1; and determine a network service class of each of the N networks according to the M quality of service parameters of each of the N networks, wherein the N networks comprise the first network and the second network.

17. The computer program product of claim 16, wherein in a manner of determining the network service class of each of the N networks, the instructions further cause the apparatus to:

score the monitored M quality of service parameters according to a weight of each quality of service parameter; and determine the network service class of each of the N networks according to a scoring result.

18. The computer program product of claim 15, wherein in a manner of obtaining the priority of the first network service, the instructions further cause the apparatus to:

obtain an internet protocol (IP) packet of the first network service;

parse a type of service (TOS) field in the IP packet; and determine the priority of the first network service according to the TOS field.

* * * * *